(12) United States Patent
Tamura

(10) Patent No.: US 6,389,508 B1
(45) Date of Patent: May 14, 2002

(54) INFORMATION STORING APPARATUS HAVING A DATA PREWRITE UNIT

(75) Inventor: Masaaki Tamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/376,028

(22) Filed: Aug. 17, 1999

(30) Foreign Application Priority Data

Feb. 26, 1999 (JP) .......................................... 11-049613

(51) Int. Cl.[7] .............................................. G06F 12/00
(52) U.S. Cl. ...................................... 711/112; 711/198
(58) Field of Search .......................... 711/111, 112, 198

(56) References Cited

U.S. PATENT DOCUMENTS

| | | | | |
|---|---|---|---|---|
| 5,613,066 A | * | 3/1997 | Matsushima et al. | 714/49 |
| 5,841,598 A | * | 11/1998 | Horiuchi et al. | 360/31 |
| 5,890,210 A | * | 3/1999 | Ishii et al. | 711/113 |
| 5,937,426 A | * | 8/1999 | Sokolov | 711/113 |
| 6,078,998 A | * | 6/2000 | Kamel et al. | 711/151 |
| 6,145,052 A | * | 11/2000 | Howe et al. | 711/112 |
| 6,170,042 B1 | * | 1/2001 | Gaertner et al. | 711/158 |
| 6,272,565 B1 | * | 8/2001 | Lamberts | 710/43 |
| 6,272,589 B1 | * | 8/2001 | Aoki | 711/112 |

OTHER PUBLICATIONS

"Chips for hard disk drives help slash storage costs"; *Computer Design*; Apr. 1997; pp. 39, 42–43.

* cited by examiner

*Primary Examiner*—Kevin Verbrugge
(74) *Attorney, Agent, or Firm*—Greer, Burns & Crain, Ltd.

(57) ABSTRACT

An information storing apparatus in which a write command issued from a host is finished by completion of writing of data onto a medium, includes a prewrite processing unit for storing data corresponding to a write command subsequent to a current write command into a data buffer while the data corresponding to the current write command is being written to the medium without waiting for a completion of the writing of data corresponding to the current write command onto the medium by a medium writing unit.

12 Claims, 17 Drawing Sheets

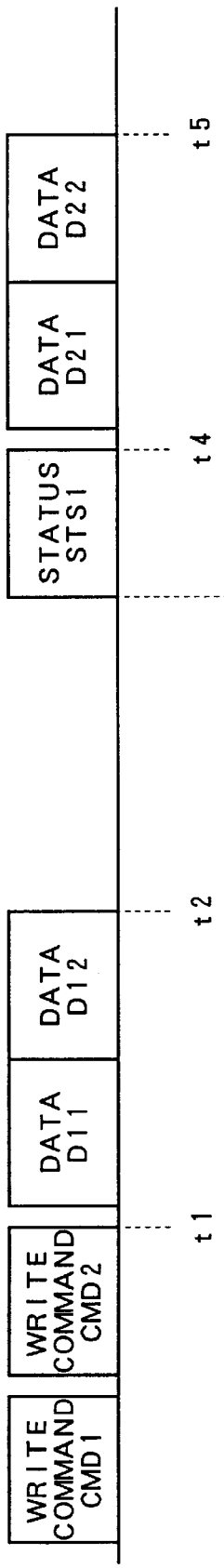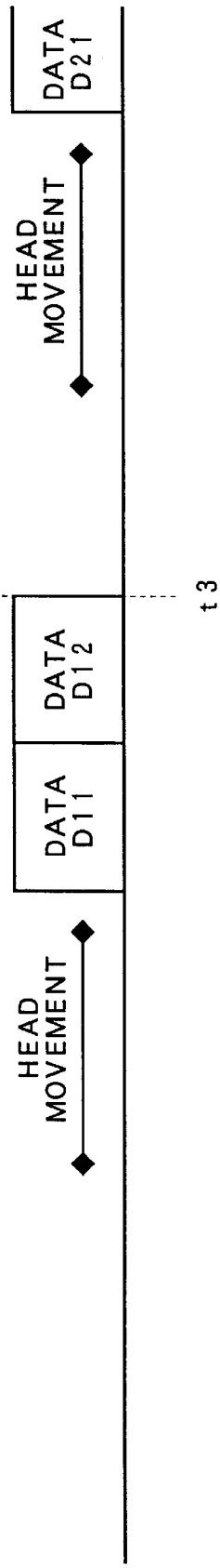

FIG. 6

| BIT<br>BYTE | 7 | 6 | 5 | 4 | 3 | 2 | 1 | 0 |
|---|---|---|---|---|---|---|---|---|
| 0 | 0 | 0 | 0 | COMMAND CODE ⎯80 | | | | |
| 1 | 0 | LUN | | LOGIC BLOCK ADDRESS | | | | |
| 2 | LOGIC BLOCK ADDRESS | | | | | | | |
| 3 | LOGIC BLOCK ADDRESS (LSB) | | | | | | | |
| 4 | TRANSFER DATA LENGTH | | | | | | | |
| 5 | (V) | | | (R) | | | FLAG | LINK |

FIG. 7

| BIT 7 | 6 | 5 | 4 | 3 | 2 | 1 | 0 | |
|---|---|---|---|---|---|---|---|---|
| 0 | 0 | | | STATUS BYTE CODE | | | 0 | |
| 0 | 0 | 0 | 0 | 0 | 0 | 0 | 0 | (00) GOOD STATUS (COMMAND EXECUTION IS NORMALLY ENDED) |
| 0 | 0 | 0 | 0 | 0 | 0 | 1 | 0 | (02) CHECK CONDITION STATUS (ERROR, UNEXECUTABLE, ABNORMAL END : SENSOR GENERATION) |
| 0 | 0 | 0 | 0 | 1 | 0 | 0 | 0 | (08) BUSY STATUS (IDD IS IN BUSY STATE AND COMMAND IS UNACCEPTABLE) |
| 0 | 0 | 0 | 1 | 0 | 0 | 0 | 0 | (10) INTERMEDIATE/GOOD STATUS (LINK INSTRUCTION COMMAND IS NORMALLY ENDED) |
| 0 | 0 | 0 | 1 | 1 | 0 | 0 | 0 | (18) RESERVATION/CONFLICT STATUS (THE OVER INIT ARE IN RESERVATION STATE) |
| 0 | 0 | 1 | 0 | 1 | 0 | 0 | 0 | (28) QUEUE FULL STATUS (THERE IS NO VACANCY IN COMMAND QUEUE AND NO COMMAND CAN BE REGISTERED) |

FIG. 8A

```
         76
A001  ┌─────────────────────────┐
      │ WRITE  COMMAND  CMD 1   │
A002  ├─────────────────────────┤
      │ WRITE  COMMAND  CMD 2   │
A003  ├─────────────────────────┤
      │ WRITE  COMMAND  CMD 3   │
A004  ├─────────────────────────┤
      │ WRITE  COMMAND  CMD 4   │
A005  ├─────────────────────────┤
      │         VACANT          │
A006  ├─────────────────────────┤
      │         VACANT          │
A007  ├─────────────────────────┤
      │           ⋮             │
A128  │                         │
      │         VACANT          │
      └─────────────────────────┘
```

| NEXT COMMAND RECEIVING POINTER P1 | A001 |
|---|---|
| DATA RECEIVING POINTER P2 | A002 |
| MEDIUM WRITING POINTER P3 | A004 |
| STATUS REPORTING POINTER P4 | A005 |

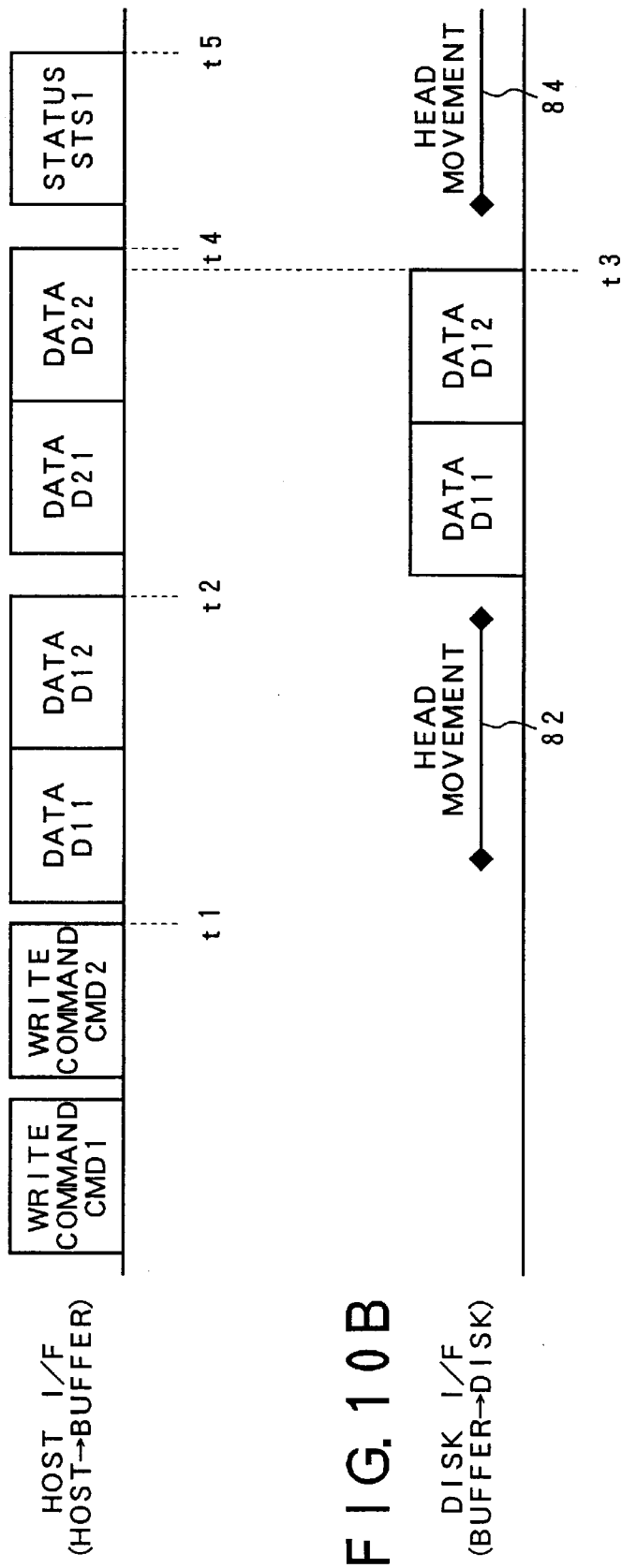
FIG. 10A HOST I/F (HOST→BUFFER)
FIG. 10B DISK I/F (BUFFER→DISK)

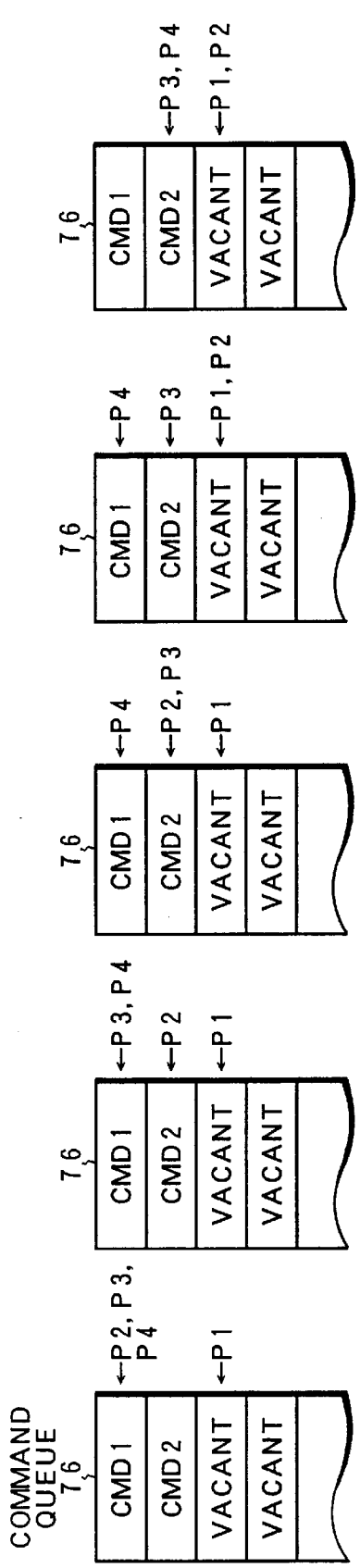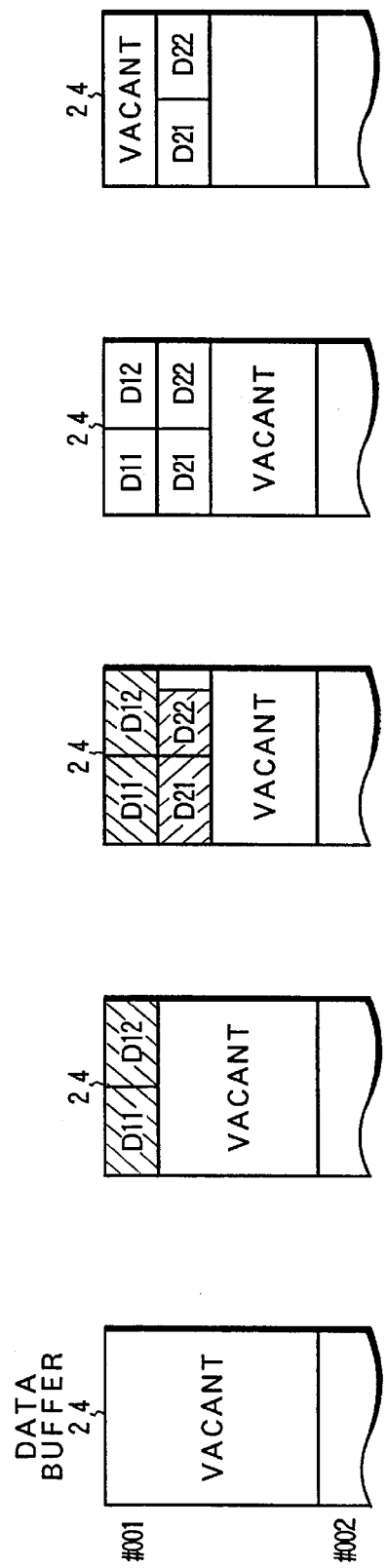

F I G. 1 4
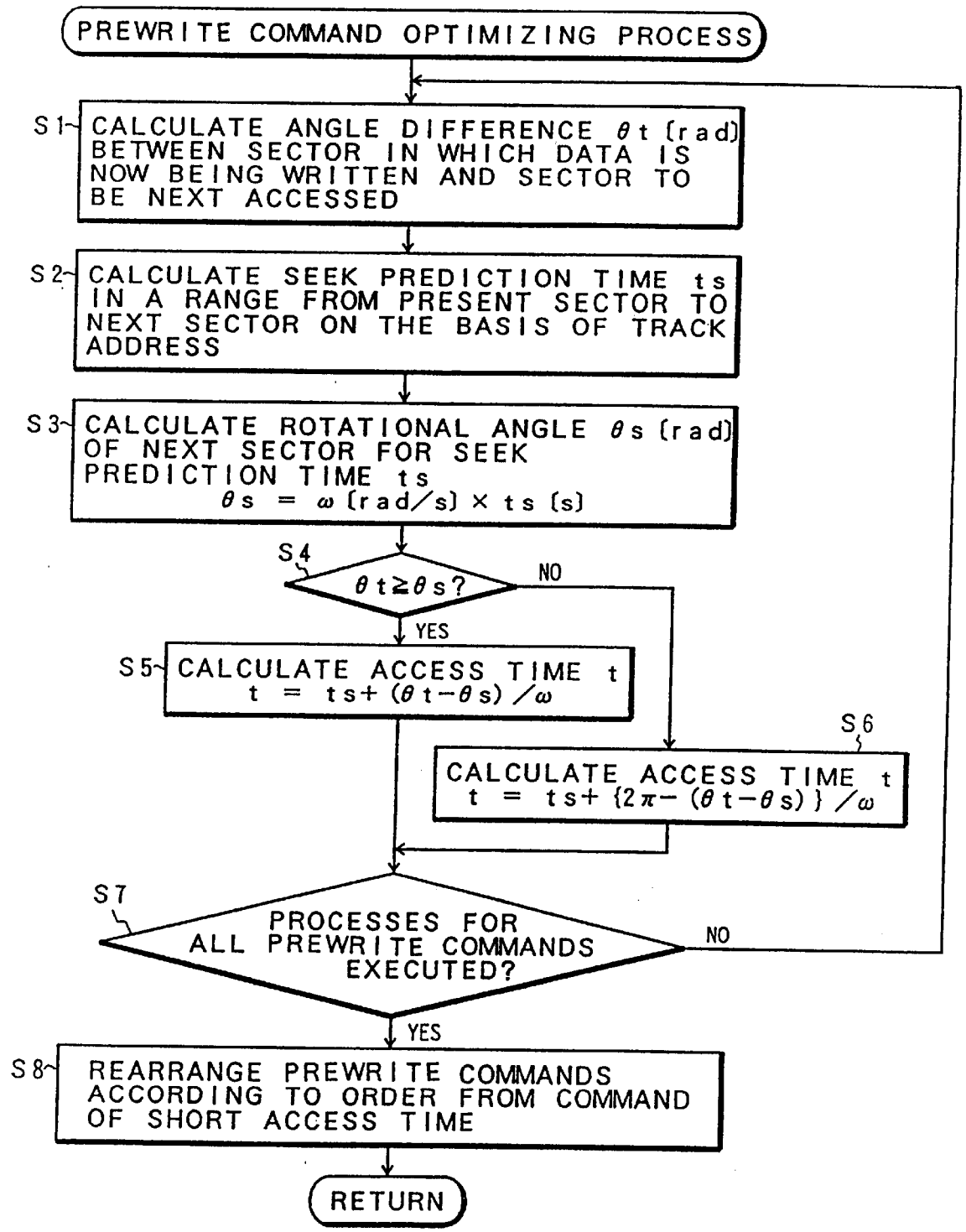

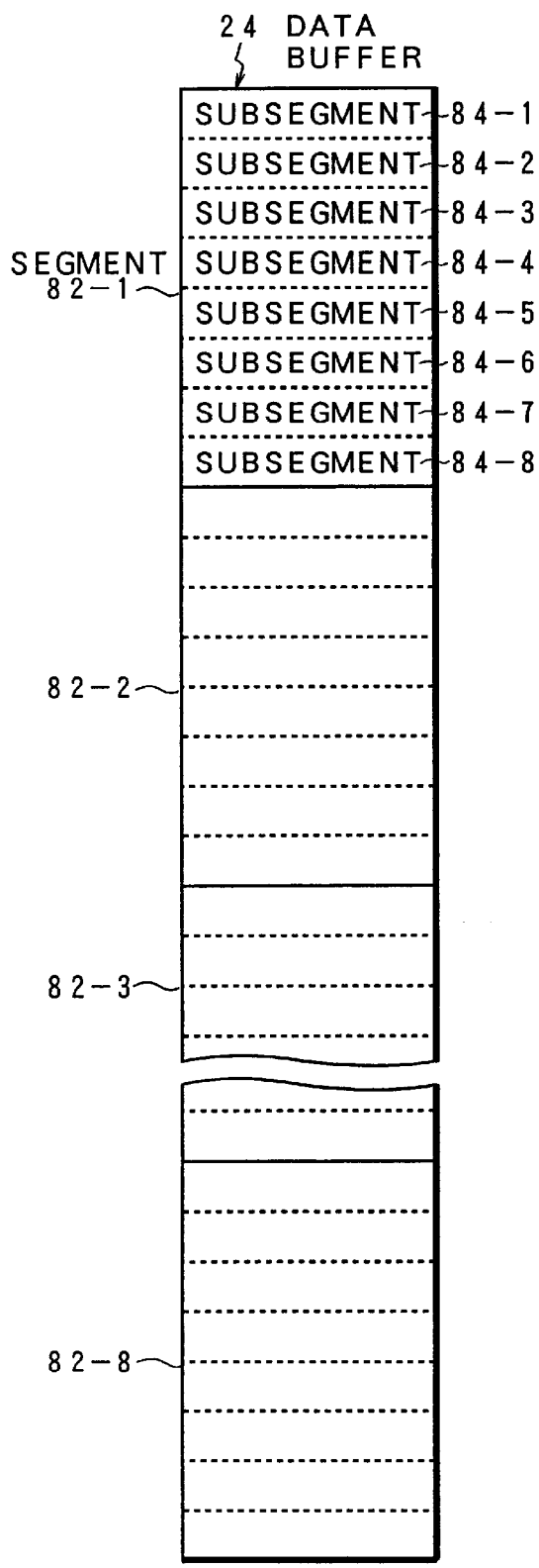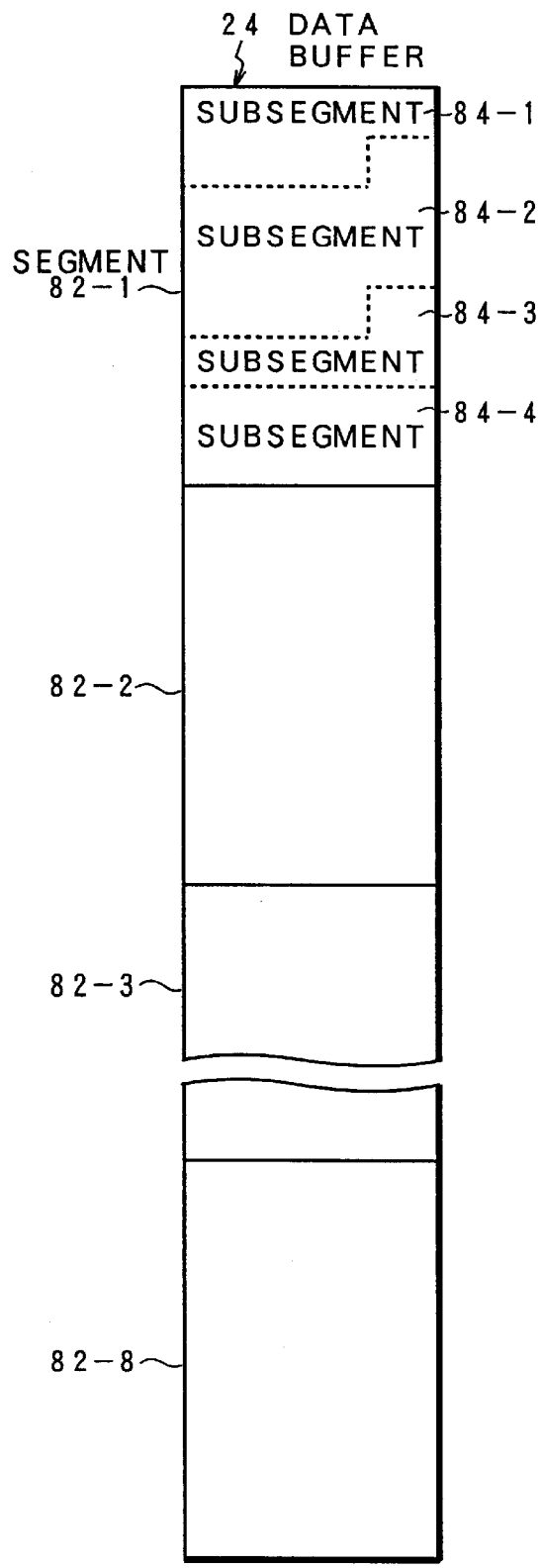

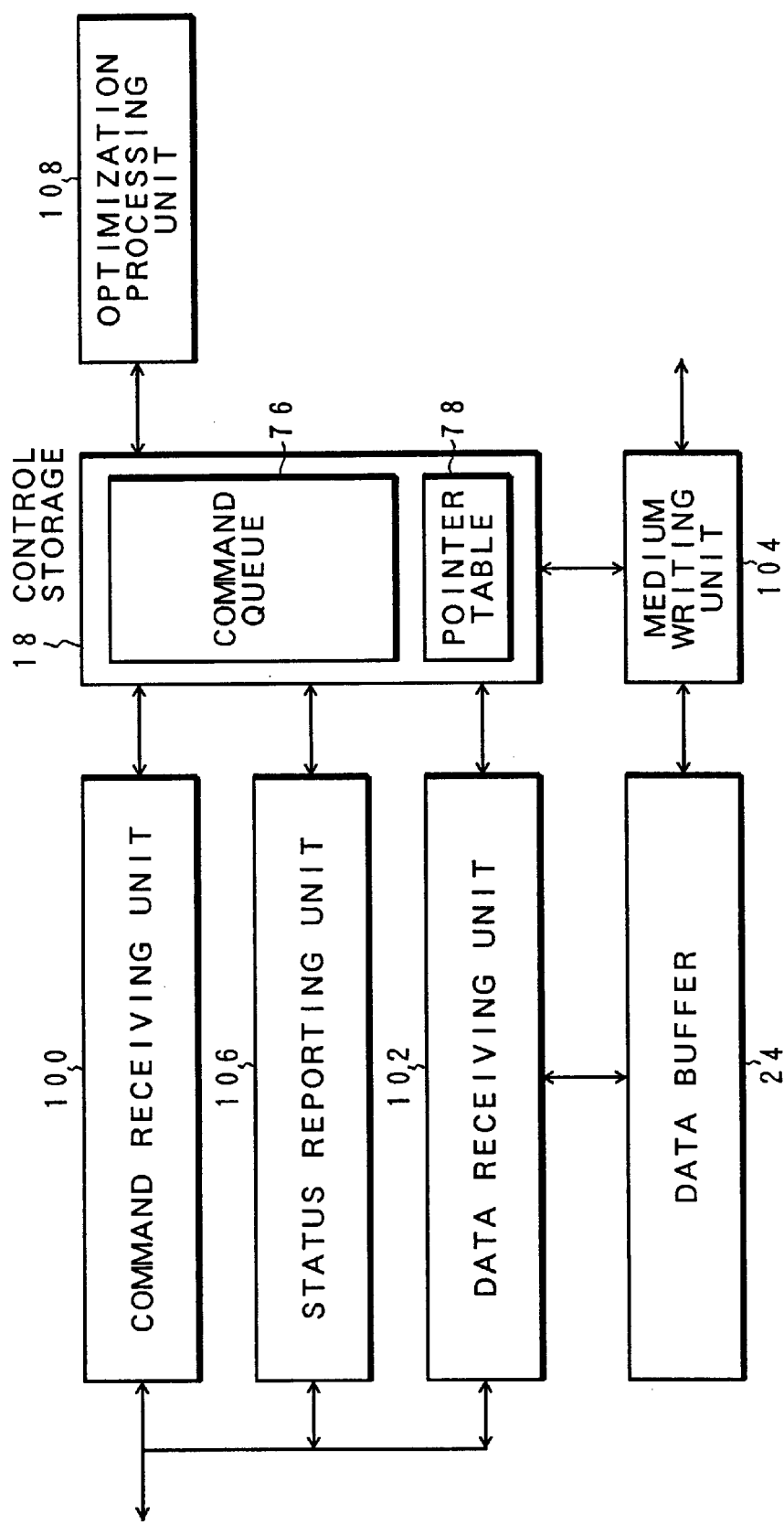

INFORMATION STORING APPARATUS HAVING A DATA PREWRITE UNIT

BACKGROUND OF THE INVENTION

The present invention relates to an information storing apparatus such as a magnetic disk drive or the like for writing data transferred by a write command from a host onto a medium. More particularly, the invention relates to an information storing apparatus for receiving data of write commands subsequent to a plurality of write command successively issued from a host during the writing of data onto a medium and processing it.

In an information storing apparatus known as a hard disk, when a host writes data onto the hard disk, the host issues a write command, the hard disk requests the host to generate data in response to the write command, stores the data into a data buffer, and writes the data onto a disk medium upon completion of data reception. When the writing of the data onto the disk medium is completed, the hard disk reports a status indicative of an execution result of the write command to the host and the write command is completed. In the write command from the host, information indicative of a write start address and the number of write blocks is shown. A hard disk drive recognizes the write command by an MCU through a host interface. The data from the host is temporarily stored into a data buffer and written onto the disk medium on a block unit basis. The status is reported by the two following methods:

I. a data reception command completing method of reporting the status at the time of completion of the data reception and completing the write command; and II. a medium write command completing method of reporting the status at the time of completion of the writing of the data onto the disk and completing the write command.

According to the data reception command completing method, by finishing the write command upon completion of the data reception from the host, it is made easy to start the process of the next write command. That is, it is a command completing method whereby a command is issued to prewrite data in the data buffer. On the contrary, the medium write command completing method is a command completing method of writing data where the host confirms whether the data has normally been written onto the disk medium or not.

When a plurality of write commands are successively issued, the hard disk drive rearranges the plurality of commands in order from the write command of a short access time before execution of the plurality of write commands, thereby improving the command processing ability. Once the execution is started, the executing order is not changed after that. The start of the execution in this case denotes the start of data reception.

The data buffer is divided into some blocks called segments. The write command or read command of data is executed by using one segment. A purpose of dividing the data buffer into a plurality of blocks is that at the time of execution of the read command, data of the read command or subsequent data is held in the data buffer and, when the read command of the data held in the data buffer is issued as a subsequent command, the data is not read out from the disk medium but transferred directly from the data buffer to the host, thereby shortening a command process.

A purpose of prewriting data in the data reception command completing method is that all or a part of the write data has already been received into the data buffer before the completion of the movement of the head to the head sector of the issued write command, and the waiting of the disk medium due to the absence of the write data in the data buffer is reduced. That is, when data is not prewritten in the data buffer, the data has to be received during the movement of the head to the target sector. When the data is prewritten, the writing time of data onto the disk medium by the preceding write command is also included in the receiving time of the prewrite data from the host, so that there is sufficient time for data reception, and the waiting due to the absence of the write data in the data buffer does not easily occur. The execution of the data prewrite has, however, the following problems.

FIGS. 1A and 1B show a flow of data when write commands of two blocks are issued from the host in the data reception command completing method of completing the write command at a point when the reception of the write data is completed. FIG. 1A shows a host interface and two write commands CMD1 and CMD2 which designate data of two blocks are successively issued. When the reception of the write commands CMD1 and CMD2 is completed at time t1, the hard disk drive receives data D11 and D12 of two blocks from the host by execution of the write command CMD1, stores them into the data buffer, reports a status STS1 to the host upon completion of the data reception, and finishes the write command CMD1 at time t2. The reception of data D21 and D22 of the next write command CMD2 is consequently started and stored as prewrite data into the data buffer. A status STS2 is reported upon completion of the data reception, thereby completing the write command CMD2 at time t4.

FIG. 1B shows a disk interface. In parallel to the reception of the data D11 and D12 of two blocks from the host, a head movement to a target sector designated by the write command CMD1 is started and the writing of the data onto the disk medium is completed at time t3. As mentioned above, in the data reception command completing method of completing the command at a point when the reception of the write data is completed, since it is unnecessary to report a result of the data writing onto the disk medium to the host, a process of the next write command can be easily started in what is called a data prewrite. When the writing of data onto the disk medium fails in the data reception command completing method, however, since the initial write command has already been finished, a failure in the command is reported to the host without executing the write command next to the write command by which the data was finally prewritten. When a failure occurs in the disk writing of a plurality of commands successively issued from the host, only the command which finally fails is reported. There is consequently a problem such that the host has to perform the rewriting for all of the commands before the reported command. In order to solve the problem, the disk write command completing method in which the host can confirm that the data has normally been written onto the disk medium is usually adopted.

FIGS. 2A and 2B show a flow of data when write commands of two blocks are issued from the host in the disk write command completing method of completing a command upon completion of writing of data onto the disk. FIG. 2A shows a host interface. The two write commands CMD1 and CMD2 designating data of two blocks are successively issued. When the reception of the write commands CMD1 and CMD2 is completed at time t1, the hard disk drive receives the data D11 and D12 of two blocks from the host by the execution of the write command CMD1 and stores them into the data buffer. FIG. 2B shows a disk interface.

When the reception of the data D11 and D12 of two blocks from the host is completed at time t2, the head movement to the target sector designated by the write command CMD1 is started and the writing of the data D11 and D12 onto the disk medium is completed at time t3. Upon completion of the disk writing, the host interface reports the status STS1 to the host, thereby completing the write command CMD1. Subsequently, the data D21 and D22 by the write command CMD2 is received and, after the head movement, the data is written onto the disk. In recent years, however, the number of systems to each of which a plurality of hosts and a plurality of targets (hard disk drive and the like) are connected has been increasing. When prewriting of data is not performed, data reception is delayed because another target and the host are communicating, and a disadvantage such that data cannot be received until the head movement to the target sector is completed has been becoming unignorable.

As shown in FIGS. 1A and 1B, in case of prewriting data in the data reception command completing method, since time that is required from the command reception to the start of the data reception is short, there is a possibility that the executing order of the write commands for the disk writing is not optimized but the execution of the commands is started. If the executing order is not optimized, there is a possibility that the processing ability deteriorates more than the case where the prewrite is not executed.

As shown in FIGS. 2A and 2B, when the data is not prewritten in the medium write command completing method, the successive write commands are processed by using one segment in the data buffer, so that data in the other segments is not destroyed. As shown in FIGS. 1A and 1B, however, when the data prewrite is performed according to the data reception command completing method, since a plurality of segments are used, there is a possibility that read data which has already been stored in each segment is lost and the reading performance deteriorates.

SUMMARY OF THE INVENTION

According to the invention, there is provided an information storing apparatus in which data is prewritten even when a write command is finished upon completion of writing of data onto a disk medium, thereby assuring write data in a data buffer and improving the processing ability.

According to the invention, there is provided an information storing apparatus in which the writing order of data onto a disk when data of a plurality of write commands is received is optimized and a buffer area which is used by the command by which data is being written to the disk and that which is used by a prewrite data are equalized, thereby improving command processing ability by the prewriting of data.

According to the invention, there is provided an information storing apparatus in which a write command issued from a host is finished by completion of the writing onto a medium, comprising: a command receiving unit for receiving a plurality of write commands successively issued from the host and storing them into a command queue; a data receiving unit for receiving data from the host by the execution of the write command from a head position in the command queue and storing it into a data buffer; a medium writing unit for starting to write the reception data onto the medium upon completion of the data reception by the data receiving unit; a status reporting unit for reporting a status to the host upon completion of the data writing by the medium writing unit and finishing the write command which is being executed; and a prewrite processing unit for receiving the data from the host as prewrite data and storing it into the data buffer by the execution of the next write command without waiting for completion of the writing of the reception data onto the medium by the medium writing unit.

As mentioned above, according to the information storing apparatus of the invention, in case of finishing the write command upon completion of the writing onto the disk medium, if the reception of the data of the command which is being executed is completed for a plurality of write commands successively issued from the host, the reception of the data of the next command is started without waiting for the completion of the writing onto the disk medium, so that the command processing ability can be improved. That is, in the conventional apparatus for finishing the write command by the completion of the writing onto the disk medium, a delay of the disk writing process that is caused because of the absence of the write data in the data buffer is likely to occur when the access time is short or when a plurality of apparatuses are connected and becomes a factor of deterioration of the processing ability. However, since the prewrite data is assured in the data buffer according to the invention, the deterioration in processing performance is eliminated and the stable processing ability can be derived.

The data reception of the write commands after the write command which is being executed is defined as prewriting of data and the write command which executes data prewrite is defined as "prewrite write command".

The information storing apparatus of the invention further comprises: a next command receiving pointer P1 indicative of a storing position of a next command to be received for the command queue; a data receiving pointer P2 showing a command at the start of the reception of data from the host or during the data reception; a medium writing pointer P3 showing a command at the start of writing of the data onto the medium from the data buffer or during the data writing; and a status reporting pointer P4 indicative of a command to subsequently report a status. The next command receiving pointer P1 is advanced upon completion of the command reception by the command receiving unit. The data receiving pointer P2 is advanced upon completion of the data reception by the data receiving unit. The medium writing pointer P3 is advanced upon completion of the medium writing by the medium writing unit. Further, the status reporting pointer P4 is advanced upon completion of the status report by the status reporting unit. The next command receiving pointer P1, data receiving pointer P2, medium writing pointer P3, and status reporting pointer P4 are sequentially arranged. Whenever each pointer advances, the process shown by the advanced pointer is executed.

The information storing apparatus of the invention has an optimization processing unit for rearranging the executing order of a plurality of prewrite write commands in order from the prewrite write command in which the access time is short, thereby optimizing them in the case where a plurality of prewrite write commands in each of which the prewrite data has already been received exist in the command queue. The optimization processing unit obtains the access time of the prewrite write command as a time that is required from the completion of the medium writing of the preceding write command until the start of the medium writing of the next write command, and changes the executing order to the order from the short access time, thereby optimizing. In the case where a plurality of data received prewrite write commands exist in the command queue, by changing the executing order of the prewrite write commands to the order from the short access time as mentioned above, the command processing ability can be improved. That is, in the conventional prewrite data process, since the optimization of the executing order is inadequate, in order to prevent the deterioration of the processing ability and the deterioration of the processing ability of the data read command due to the destruction of the prewrite data, there has been used a countermeasure such that an MPU of high performance is provided for the hard disk drive to thereby perform the optimization in a short time, the number of prewrite data is increased by using a data buffer of a large capacity, or the like. According to the invention, however, the command processing ability can be improved by optimizing the executing order of the prewrite write commands without using expensive hardware.

According to the information storing apparatus of the invention, when the data buffer is divided into a plurality of areas and a plurality of write commands successively issued from the host are stored into the command queue, a buffer area which is used by the write command during the writing of data onto the disk and a buffer area which is used by the prewrite write command are made identical. For example, when the data buffer is divided into a plurality of areas each having a predetermined size and each area is finely divided into subareas by a predetermined size based on the data stored by the first write command and a plurality of write commands successively issued from the host are stored into the command queue, a subarea of a specific buffer area is used for each of the write command during the writing of data onto the disk and the prewrite write command. When the data buffer is divided into a plurality of areas each having a predetermined size and a plurality of write commands successively issued from the host are stored into the command queue, the specific buffer area can be divided into subareas and used in accordance with the data size of each of the write command during the writing of data onto the disk and the prewrite write command. By making the buffer area which is used for the write command during the writing of data onto the disk and the buffer area that is used by the prewrite write command identical as mentioned above, the prewrite data is received in a vacant area in the buffer area used by the first one of the plurality of write commands. The data prewrite is realized without breaking the prewrite data stored in the other areas.

Another embodiment of the invention relates to an information storing apparatus in which a write command issued from a host is finished by completion of data reception from the host. The information storing apparatus of such a data reception command completing method comprises: a command receiving unit for plurality of write commands successively issued from a host and storing them into a command queue; a data receiving unit for receiving data by the execution of the write command from the head position of the command queue and storing it into a data buffer; a status reporting unit for reporting a status to the host upon completion of the data reception by the data receiving unit, thereby finishing the write command which is being executed; a medium writing unit for starting to write the reception data onto the medium upon completion of the data reception by the data receiving unit; and an optimization processing unit for rearranging an executing order of a plurality of prewrite write commands to the order from the prewrite write command in which an access time is short, thereby optimizing them in the case where a plurality of prewrite write commands in which the prewrite data has already been received exist in the command queue. The optimization processing unit obtains an access time of the prewrite write command as a time that is required from the completion of the writing of data onto the medium of the preceding write command until the start of the writing of data onto the medium of the next write command and changing the executing order to the order of the prewrite write command in which the access time is short, thereby optimizing them. In the case where a plurality of data received prewrite write commands exist in the command queue, by changing the executing order of the prewrite write commands to the order from the prewrite write command in which the access time is short as mentioned above, the command processing ability can be improved. According to the information storing apparatus, when the data buffer is divided into a plurality of areas and a plurality of write commands successively issued from the host are stored into the command queue, a buffer area which is used by the write command during the writing of data onto the disk and a buffer area which is used by the prewrite write command are made identical. For example, when the data buffer is divided into a plurality of areas each having a predetermined size and each area is further finely divided into subareas each having a predetermined size based on the data stored by the execution of the first write command and a plurality of write commands successively issued from the host are stored into the command queue, the subarea in the specific buffer area is used for each of the write command during the writing of data onto the disk and the prewrite write command. When the data buffer is divided into a plurality of areas each having a predetermined size and a plurality of write commands successively issued from the host are stored into the command queue, the specific buffer area can be divided into subareas in accordance with the data size of each of the write command during the writing of data onto the disk and the prewrite write data and used. By making the buffer area which is used by the write command during the writing of data onto the disk and the buffer area which is used by the prewrite write command identical as mentioned above, the prewrite data is received in a vacant area in the buffer area used by the first one of the plurality of write commands. Thus, the data prewrite is realized without destroying the prewrite data existing in the other areas.

The above and other objects, features, and advantages of the present invention will become more apparent from the following detailed description with reference to the drawings.

BRIEF DESCRIPTION OF THE DRAWINGS

FIGS. 2A and 2B are time charts for a writing state of a conventional apparatus in which a command is finished by completion of the writing of data onto a disk;

FIG. 6 is a format explanatory diagram of commands which are used in the invention;

FIG. 7 is a format explanatory diagram of statuses which are used in the invention;

FIGS. 8A and 8B are explanatory diagrams of a command queue and a pointer table which are provided in a control storage in FIG. 5;

FIGS. 10A and 10B are time charts for a data prewriting process according to the embodiment of FIG. 5;

FIGS. 11A to 11E are explanatory diagrams of the command queue and data buffer at times t1 to t5 of the time charts of FIGS. 10A and 10B;

FIG. 14 is a flowchart for an optimizing process of a prewrite write command;

FIGS. 15A and 15B are explanatory diagrams of a construction of a data buffer to store prewrite data; and FIG. 16 is a functional block diagram of another embodiment of the invention in which a command is finished upon completion of the data reception from the host.

DETAILED DESCRIPTION OF THE PREFERRED EMBODIMENTS

Figures 1A, 1B:
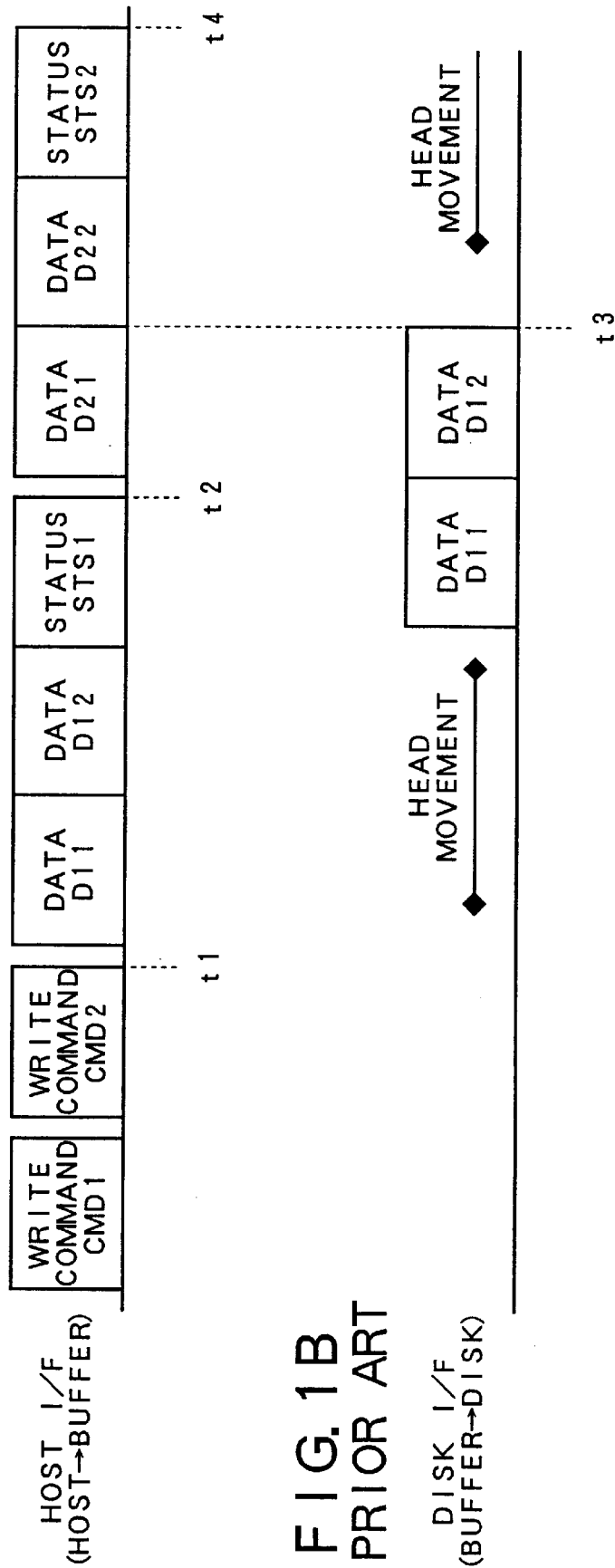
FIGS. 1A and 1B are time charts for a writing state of a conventional apparatus in which a command is finished by completion of the data reception from a host.
Figure 3:
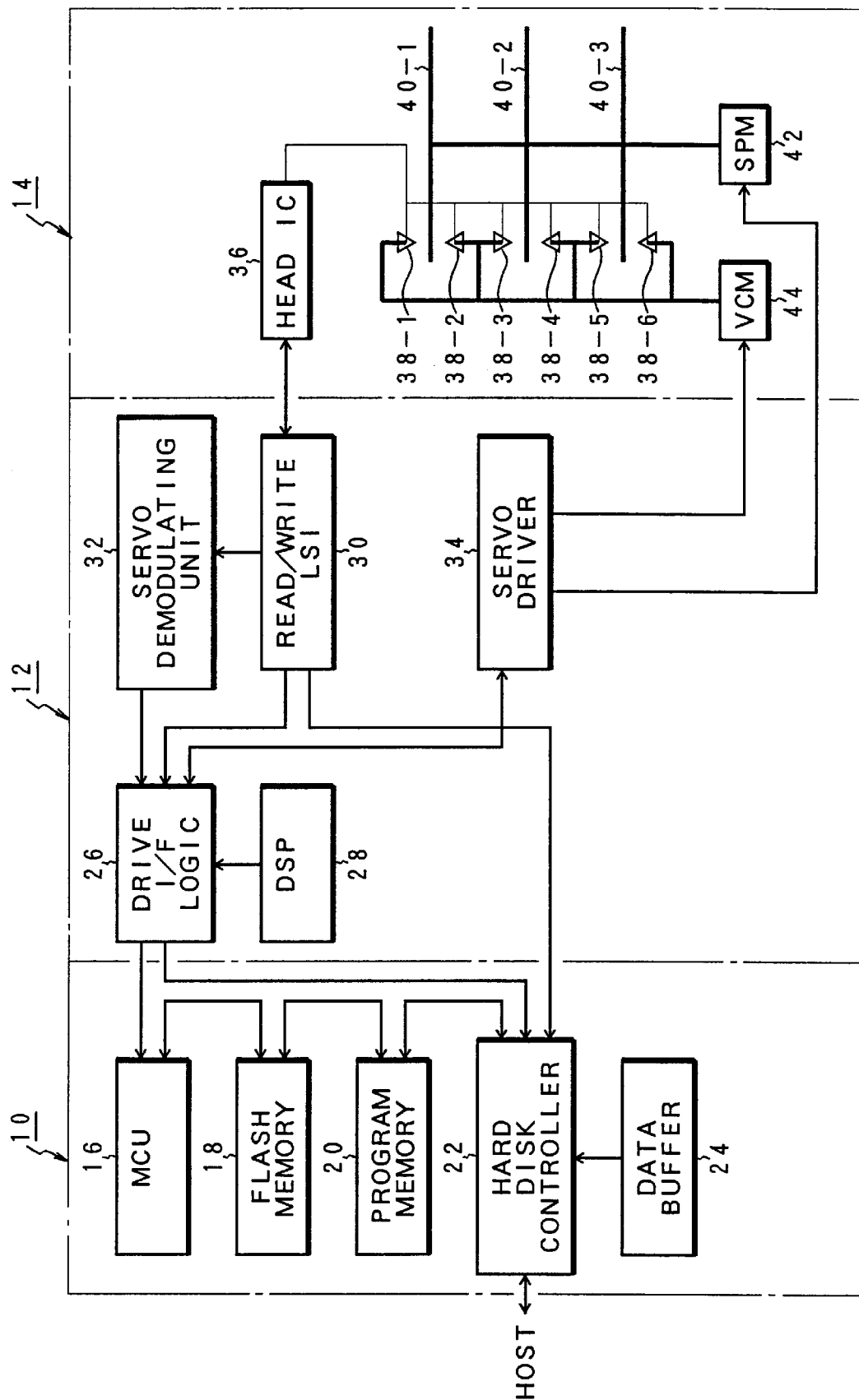
FIG. 3 is a block diagram of a hard disk drive to which the invention is applied.

FIG. 3 is a block diagram of a hard disk drive to which the invention is applied. The hard disk drive is constructed by an SCSI controller 10; a drive controller 12; and a disk enclosure 14. The SCSI controller 10 has: an MCU 16; a flash memory 18 which is used as a control storage; a program memory 20 in which a control program has been stored; a hard disk controller 22; and a data buffer 24. The drive controller 12 has: a drive interface logic 26; a DSP 28; a read/write LSI 30; a servo demodulating unit 32; and a servo driver 34. A head IC 36 is provided in the disk enclosure 14. The head IC 36 is connected to combination heads 38-1 to 38-6 each comprising a writing head and a reading head. The combination heads 38-1 to 38-6 are provided for the respective recording surfaces of magnetic disks 40-1 to 40-3 and positioned to arbitrary sector positions of the disk media 40-1 to 40-3, respectively, by a VCM 44. Each of the magnetic disks 40-1 to 40-3 is rotated at a predetermined speed by a spindle motor 42.

A write command issued from the host is stored into a command queue in the flash memory 18 via the hard disk controller 22. The MCU 16 extracts the write command from the head position of the command queue in the flash memory 18 and requests the host to transfer write data by using the hard disk controller 22. The write data transferred from the host is stored into the data buffer 24. After completion of the storage of the write data into the data buffer 24, the MCU 16 activates the hard disk controller 22, thereby allowing the writing operations to be performed for the magnetic disks 40-1 to 40-3. That is, the write data stored in the data buffer 24 passes through the hard disk controller 22, drive interface logic 26, read/write LSI 30, and writing system head IC 36 and is written to the sector position designated by the write command on the magnetic disk 40-1 from, for example, the combination head 38-1. At the same time, the DSP 28 controls the head positioning operation by the VCM 44 to the sector position given by the write command on the basis of a servo demodulation signal obtained through the servo driver 34 and servo demodulating unit 32. When the combination head 38-1 is positioned to a target sector designated by the write command, the writing of the write data onto the disk is executed. In this manner, when the writing of the write data from the data buffer 24 onto the magnetic disk is completed, the MCU 16 reports a status indicative of the normal end of the writing of the write data to the host through the hard disk controller 22.

Figure 4:
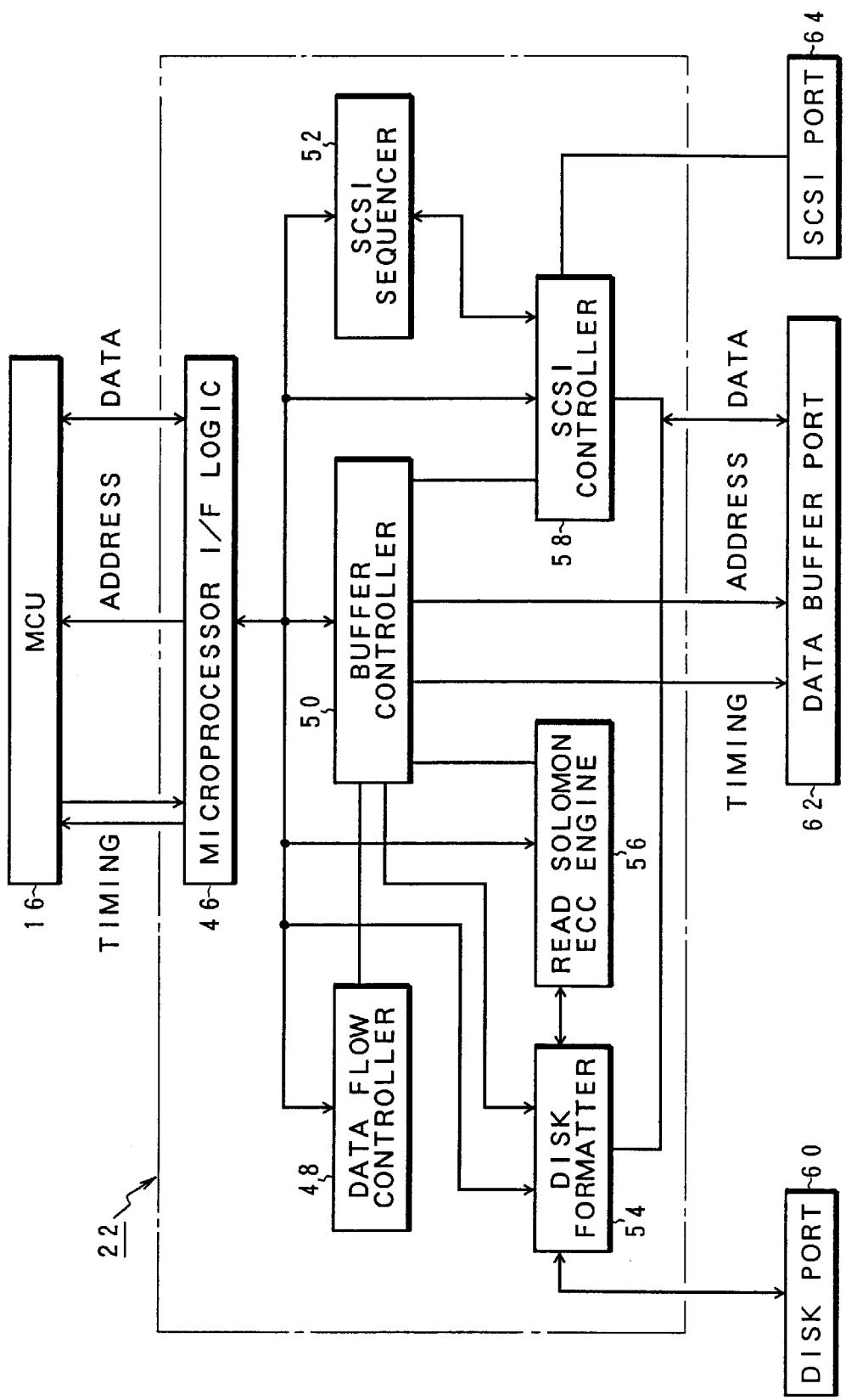
FIG. 4 is a block diagram of a hard disk controller in FIG. 3.

FIG. 4 is a block diagram of an internal construction of the hard disk controller 22 in FIG. 3. The hard disk controller 22 comprises: a microprocessor interface logic 46; a data flow controller 48; a buffer controller 50; an SCSI sequencer 52; a disk formatter 54; a Reed Solomon ECC engine 56; and an SCSI controller 58. An SCSI port 64 to connect to the host is provided for the SCSI controller 58. A data buffer port 62 to connect to the data buffer 24 is provided for the SCSI controller 58 and disk formatter 54. Further, a disk port 60 to connect to the drive I/F logic 26 in FIG. 3 is provided for the disk formatter 54. The write command from the host is supplied from the SCSI port 64 to the SCSI controller 58, sent to the MCU 16 side through the buffer controller 50 and microprocessor I/F logic 46, and stored into a command queue in the flash memory 18. Write data which is sent from the host by the execution of the write command passes from the SCSI port 64 via the SCSI controller 58 and is stored into the data buffer 24 from the data buffer port 62. The write data stored in the data buffer 24 is read out and transferred to the disk formatter 54 via the data buffer port 62 and is subjected to a formatting process to write it onto the magnetic disk. At the same time, an ECC encoding process by the Reed Solomon code having a multibyte correcting function is performed to the write data by the Reed Solomon ECC engine 56. The resultant processed write data is sent from the disk port 60 to the magnetic disk side and written thereon. The transfer of command and data between the apparatus and the host is controlled by the SCSI sequencer 52 and SCSI controller 58. The writing and reading operations of data into/from the data buffer 24 are controlled by the buffer controller 50. Further, the writing of the write data read out from the data buffer onto the disk via the disk port is controlled by the data flow controller 48.

Figure 5:
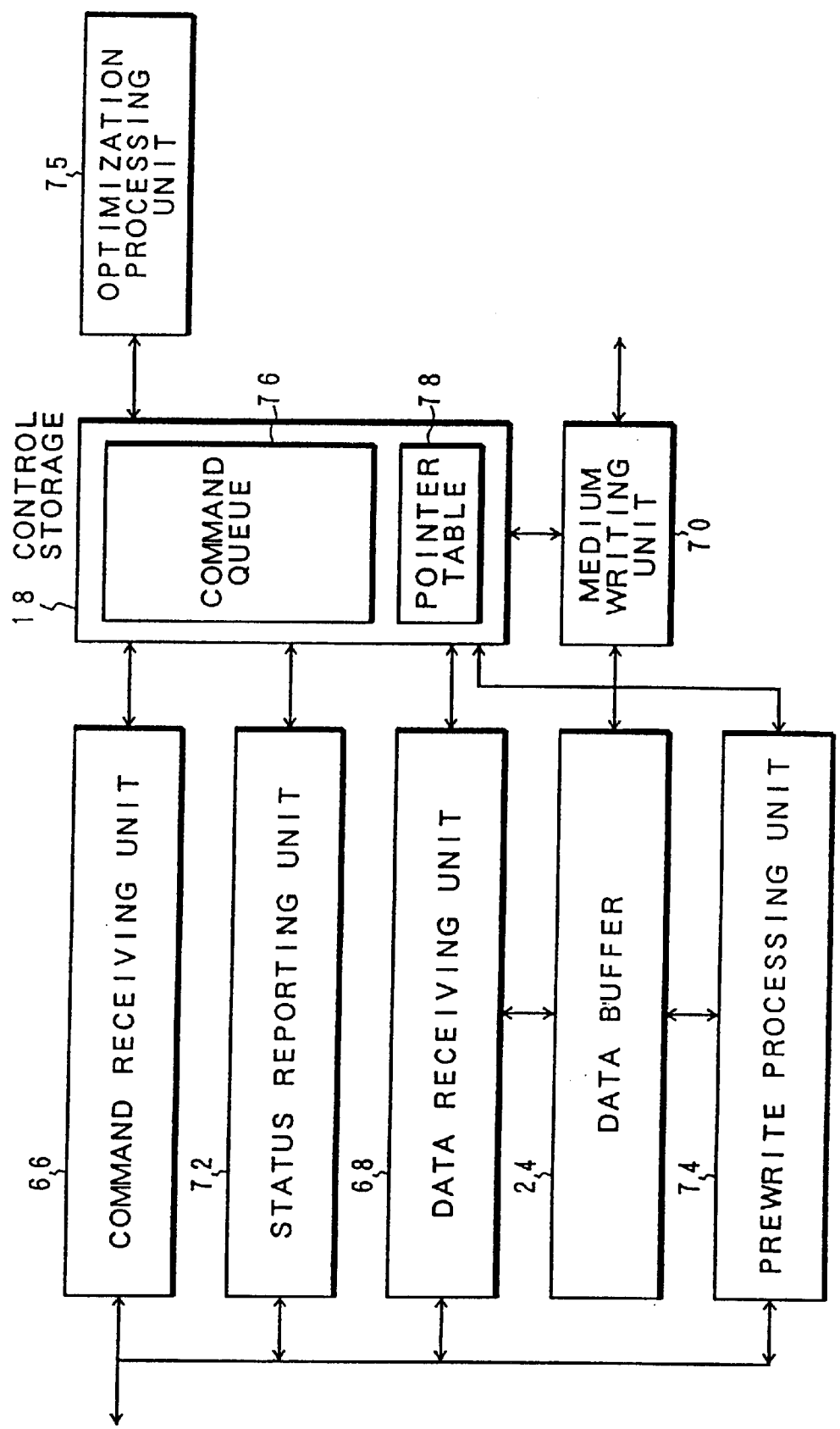
FIG. 5 is a functional block diagram of an embodiment of the invention in which a command from a host is finished by completion of the writing of data onto a disk.

FIG. 5 is a functional block diagram in the embodiment of the information storing apparatus according to the invention. This information storing apparatus is an apparatus of the medium write command completing method such that the write command issued from the host is finished by completion of the writing of data onto the medium and is characterized in that the data is received as prewrite data from the host by the execution of the next write command without waiting for completion of the writing of data onto the medium by the write command by which the writing of data onto the disk is at present being executed. The information storing apparatus comprises: a command receiving unit 66; a data receiving unit 68; a medium writing unit 70; a status reporting unit 72; and a prewrite processing unit 74. A command queue 76 and a pointer table 78 are provided for the command receiving unit 66, data receiving unit 68, medium writing unit 70, and prewrite processing unit 74 by the control storage which is realized by the flash memory 18 in FIG. 3. The command receiving unit 66 receives a plurality of write commands successively issued from the host and stores them into the command queue 76. The data receiving unit 68 receives the data from the host and stores it into the data buffer 24 by the execution of the write command from the head position in the command queue 76. The medium writing 70 completes the writing of the received data onto the medium upon completion of the reception of the write data from the host by the data receiving unit 68. The status reporting unit 72 reports the status to the host upon completion of the writing by the medium writing unit 70, thereby finishing the write command which is being executed. Further, the prewrite processing unit 74 receives the data corresponding to next write command from the host as prewrite data and stores it into the data buffer 24 while the previous write command is being executed without waiting for completion of the writing of the data corresponding to the previous write command onto the medium by the medium writing unit 70.

FIG. 6 is a format explanatory diagram of commands which are issued from the host and a command having a length of 6 bytes is shown as an example. If "2A" is now set as a command code 80 with respect to this command, it is a write command of "Write Extended". It is possible to designate the writing of data having an arbitrary number of blocks shown by a transfer data length designated by the fourth byte from the logic block designated by the first, second, and third bytes.

FIG. 7 is a format explanatory diagram of statuses which are reported to the host upon completion of the writing of data onto the disk medium. This status is status information of one byte. Five bits of the first to the fifth bits are used for a status byte code. There are: a good status in which the command execution is normally finished; a check condition status showing an abnormality such as error, unexecutable, abnormal end, sensor generation, or the like; a busy status showing that the hard disk drive is in a busy state and the command is unacceptable; an intermediate/good status showing the normal end of a link instruction command; a reservation/conflict status showing that the initiator serving as another host is in a reservation state; a queue full status showing that there is no vacancy in the command queue and no command can be registered in the command queue; and the like.

FIGS. 8A and 8B are explanatory diagrams of the command queue 76 and pointer table 78 provided in the flash memory 18 as a control storage in FIG. 5. FIG. 8A shows the command queue 76 and shows a state where, for example, four write commands CMD1, CMD2, CMD3, and CMD4 which are issued from the host and each of which has the command format of FIG. 6 have been stored in the command queue. The pointer table 78 of FIG. 8B is provided for the write commands CMD1 to CMD4 stored in the command queue 76. The pointer table 78 has: the next command receiving pointer P1 showing the storing position of a command to be received next for the command queue 76; the data receiving pointer P2 showing a command indicative of the start of data reception from the host or a command indicating that the data is being received; the medium writing pointer P3 showing a command indicative of the start of data writing onto the medium from the data buffer 24 or a command indicating that the data is being written; and the status reporting pointer P4 indicative of a command to subsequently report a status. Head addresses A001, A002, A004, and A005 of the write commands CMD1 to CMD4 in the command queue 76 shown by those pointers have been stored in those four kinds of pointers P1 to P4, respectively. Each of the pointers P1 to P4 is advanced by one when the corresponding process is finished. That is, the next command receiving pointer P1 advances upon completion of the command reception by the command receiving unit 66. The data receiving pointer P2 advances upon completion of the data reception by the data receiving unit 68. The medium writing pointer P3 advances upon completion of the writing of data onto the medium by the medium writing unit 70. Further, the status reporting pointer P4 advances upon completion of the status report by the status reporting unit 72. The pointers P1 to P4 are arranged in order of the next command receiving pointer P1, data receiving pointer P2, medium writing pointer P3, and status reporting pointer P4. Whenever each pointer advances, the process shown by the advanced pointer is executed.

Figure 9:
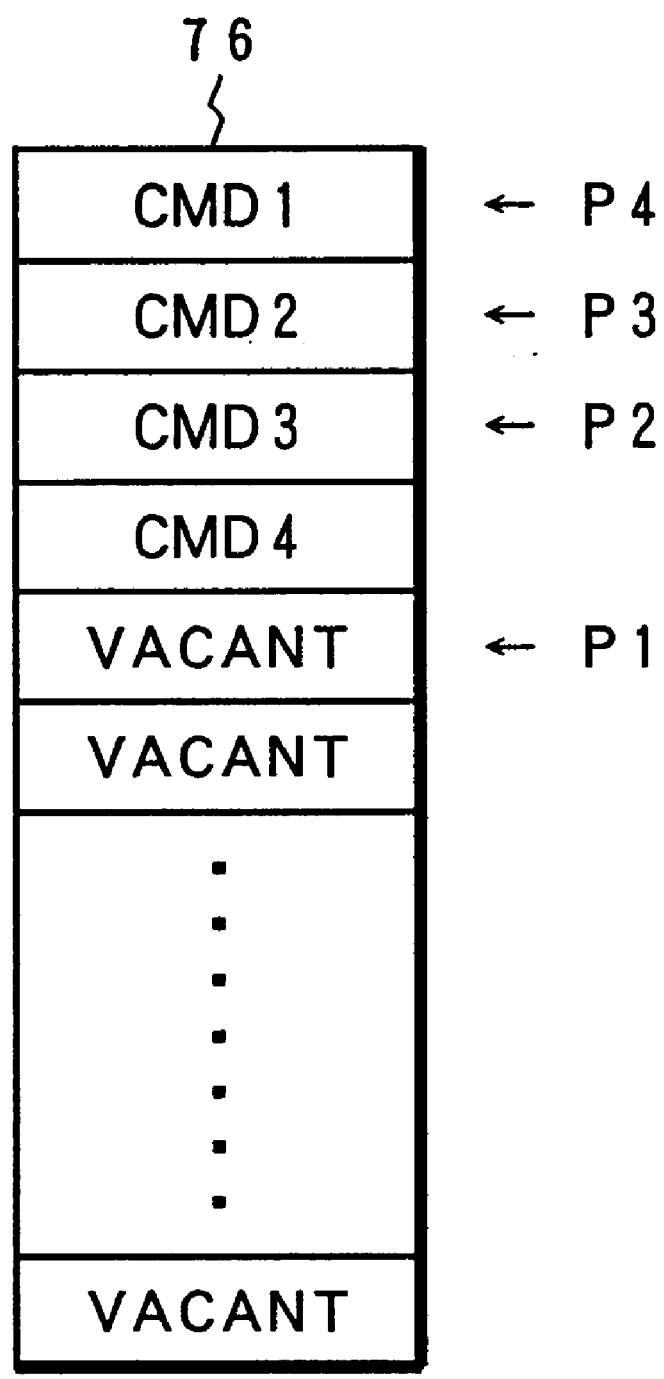
FIG. 9 is an explanatory diagram of setting states of pointers for the command queue in FIGS. 8A and 8B.

The relation of the pointer table 78 for the command queue 76 in FIG. 8A can be expressed as shown in FIG. 9. The pointers P1, P2, P3, and P4 are set as shown in FIG. 9 into the four write commands CMD1 to CMD4 stored in the command queue 76 and the first vacant area by setting the addresses A001 to A005 in the command queue into the pointer table 78 as shown in FIG. 8B. In case of writing data, the pointer can advance in accordance with the following order.

I. next command receiving pointer P1
    II. data receiving pointer P2
    III. medium writing pointer P3
    IV. status reporting pointer P4

Therefore, since the pointer locating ahead advances, the process shown by this pointer can be executed. In case of FIG. 9, the four write commands CMD1 to CMD4 are received and are executed in accordance with the write commands CMD1, CMD2, CMD3, and CMD4. The write command CMD1 in which the status reporting pointer P4 has been set indicates a state where the data has been written onto the disk and the status is reported. The write command CMD2 in which the medium writing pointer P3 has been set indicates that the data has already been received from the host and the writing of data onto the disk is started or being executed with respect to the write command CMD2. The write command CMD3 in which the data receiving pointer P2 has been set indicates that the reception of the data from the host is started or being executed. In the information processing apparatus of the invention, by the setting control of the pointers P1 to P4 for the command queue 76 as mentioned above, the writing process including the data prewrite when a plurality of write commands successively issued from the host are executed is realized.

FIGS. 10A and 10B are time charts for the writing process by the information processing apparatus of the invention shown in the functional block in FIG. 5. FIG. 10A shows a state of the host interface from the host to the data buffer and a case where the two write commands CMD1 and CMD2 designating two blocks have successively been issued from the host as an example. When the write commands CMD1 and CMD2 are received from the host and the command reception is completed at time t1, the transfer of the data D11 and D12 of the write command CMD1 is subsequently requested to the host. The reception of the data D11 and D12 is finished at time t2. In the disk interface in FIG. 10B, after the write commands CMD1 and CMD2 are received from the host at time t1, a head movement 82 is started to write the data onto the disk by the execution of the write command CMD1. Upon completion of the head movement, the data D11 and D12 stored in the data buffer upon completion of the reception is written onto the disk at time t2. In parallel with the writing of the data D11 and D12 onto the disk, the prewrite processing unit 74 in FIG. 5 requests the host to transfer the data D21 and D22 of the write command, CMD2. In parallel with the writing of the data D11 and D12 onto the disk, the data D21 and D22 of the next write command CMD2 is received as prewrite data from the host and stored into the data buffer 24. When the writing of the data D11 and D12 onto the disk in the disk interface is finished at time t3 and the reception of the data D21 and D22 of the next write command CMD2 from the host is subsequently completed at time t4, the status STS1 indicative of the normal end of the disk writing of the write command CMD1 is reported to the host. The status report is completed at time t5. At the same time, a head movement 84 by the execution of the next write command CMD2 is started. The received data D21 and D22 is written as prewrite data onto the disk by the completion of the head movement, and the status is reported. In the information storing apparatus of the invention as mentioned above, even in the method of reporting the status to the host upon completion of the writing of data onto the disk and finishing the write command, in parallel with the writing of the data onto the disk by the write command which is at present being executed, the data of the write command to be executed next can be received as prewrite data from the host. Subsequent to the completion of the disk writing that is at present being executed, the data of the next write command can be immediately written onto the disk. Consequently, a delay of the disk writing process which occurs because the data from the host does not exist in the data buffer upon writing of data onto the disk is prevented. The processing performance of the writing process can be remarkably improved.

FIGS. 11A to 11E time-sequentially show a pointer setting for the command queue 76 in the writing process in FIGS. 10A and 10B and statuses of the data buffer 24. FIG. 11A corresponds to time t1 in FIGS. 10A and 10B and shows a state where the next command receiving pointer P1 advances by "1" upon completion of the reception of the write command CMD2 and the next command storing position is shown. In this instance, no data is received in the data buffer 24. FIG. 11B corresponds to time t2 in FIGS. 10A and 10B and shows a state where the data receiving pointer P2 advances by "1" upon completion of the reception of the data D11 and D12 of the write command CMD1 and the data reception is shown with respect to the next write command CMD2. In this instance, the data D11 and D12 received from the host has bee n stored in the data buffer 24 with regard to the write command CMD1 which is at present being executed. FIG. 11C corresponds to time t3 in FIGS. 10A and 10B and shows a state where the medium writing pointer P3 advances by "1" upon completion of the writing of the data D11 command D12 onto the disk and the pointer P3 has been set to the same position as that of the data receiving pointer P2 indicative of the reception of the data D21 and D22 of the next write command CMD2 w which is at present being executed. In this instance, the data D21 and the data on the halfway of the data D22 of the next write command CMD2 have been stored in the data buffer 24. FIG. 11D corresponds to time t4 in FIGS. 10A and 10B and shows a state at time t4 when the prewrite of the data D21 and D22 of the next write command CMD2 has been completed. In this instance, since the data reception of the next write command CMD2 is completed, the data receiving pointer P2 advances by "1" and is set to the same position as that of the next command receiving pointer P1, the status reporting pointer P4 is set into the write command CMD1, and the medium writing pointer P3 is set into the next write command CMD2. Therefore, since the interface with the host becomes free due to the completion of the reception of the data D21 and D22, the status STS1 is reported with respect to the write command CMD1 by setting the status reporting pointer P4. At the same time, the data D21 and D22 is written onto the disk by the execution of the write command CMD2 by the medium writing pointer P3. FIG. 11E shows a state in which the report of the status STS1 of the write command CMD1 at time tS in FIGS. 10A and 10B has been completed. In this case, the status reporting pointer P4 advances by "1" and is set to the same position of the write command CMD2 as that of the medium writing pointer P3. The status of the write command CMD2 is reported by the status reporting pointer P4 after waiting for completion of the writing of the data D21 and D22 onto the medium. At this time, the data buffer 24 is handled as a vacant area for the data D11 and D12 at the end of the status report of the write command CMD1.

Figure 12A:
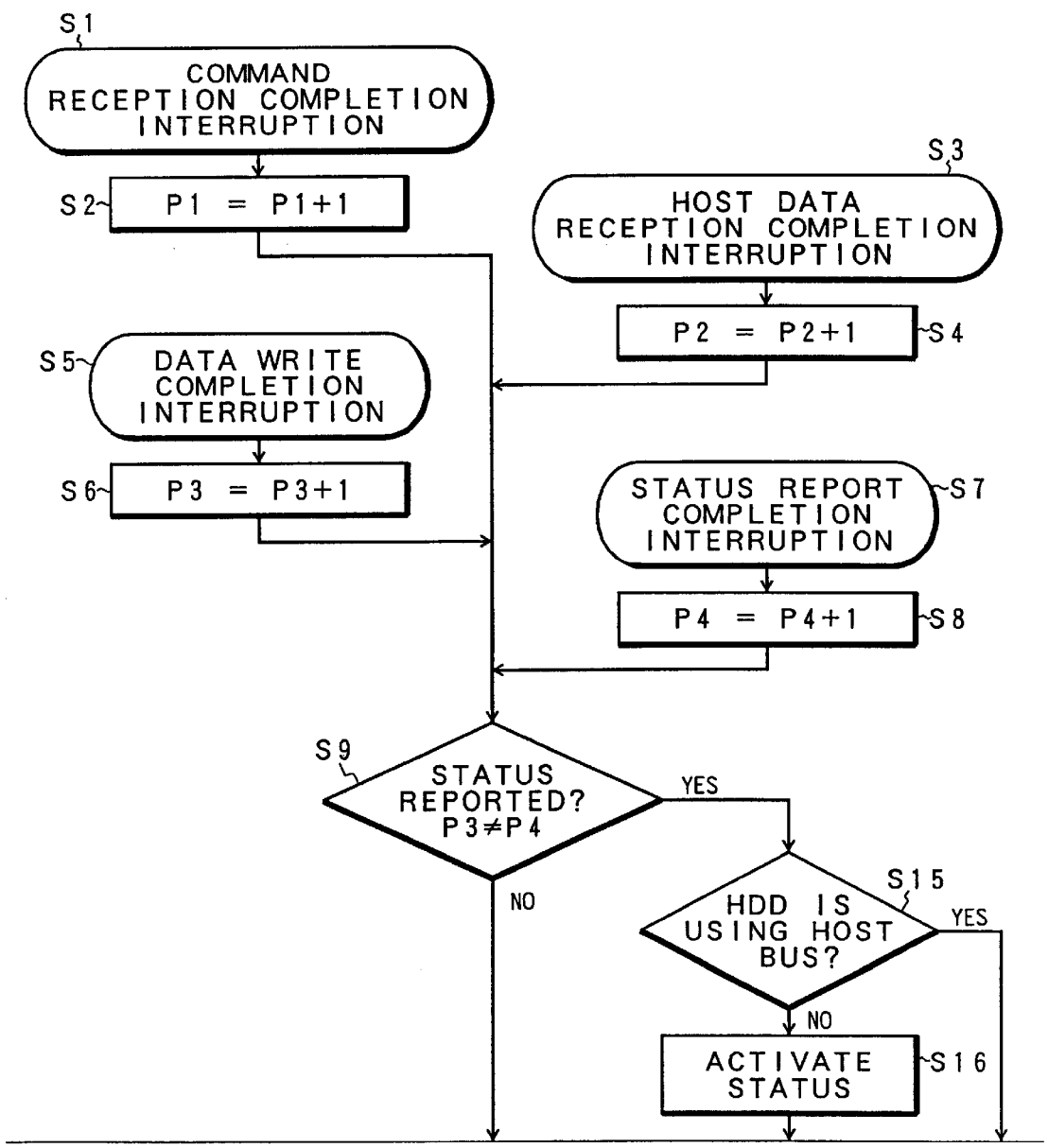
FIGS. 12A and 12B are flowcharts for a writing process in FIG. 5 by a pointer control.
Figure 12B:
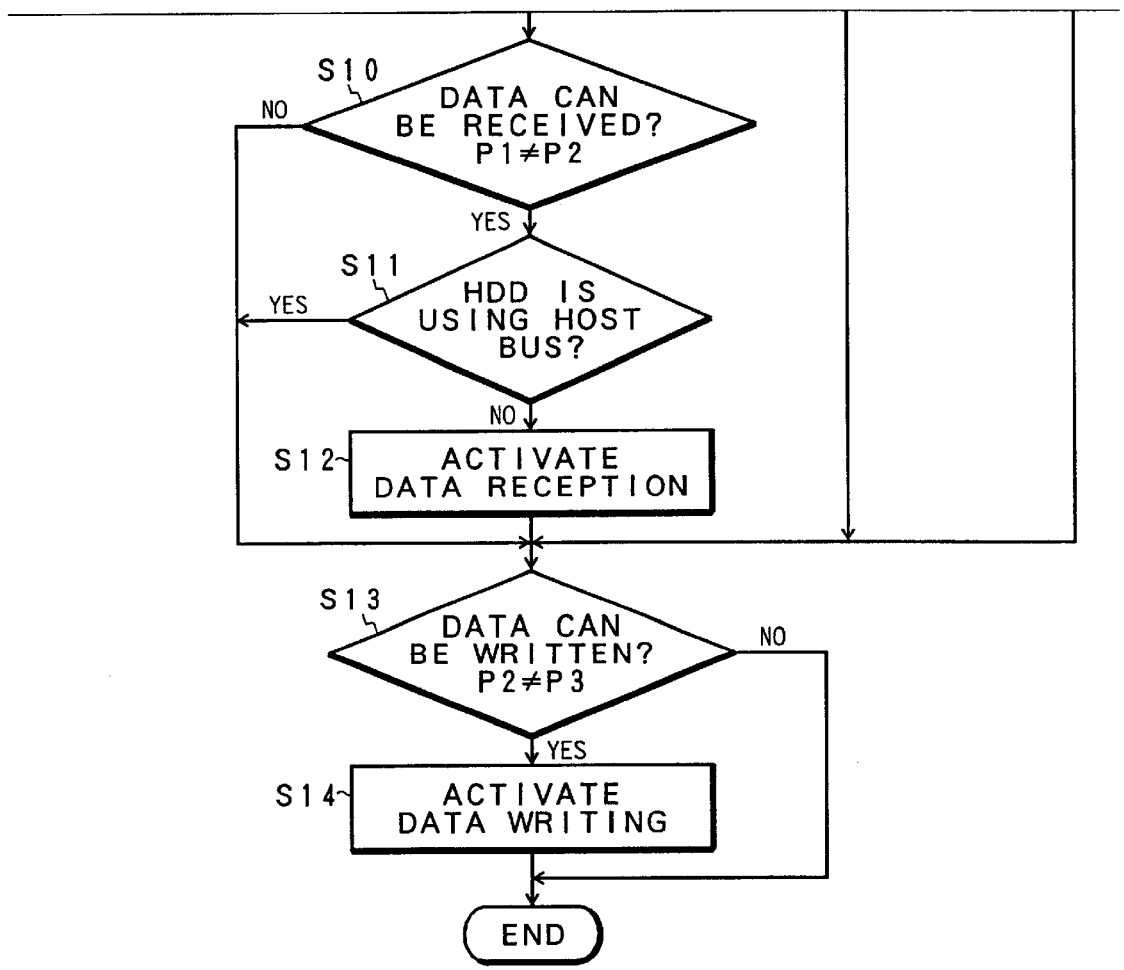

FIGS. 12A and 12B are flowcharts for a writing process using the pointers P1 to P4 in the pointer table 78 in the embodiment of FIG. 5. The writing process is activated by each of a command reception completion interruption in step S1, a host data reception completion interruption in step S3, a data writing completion interruption in step S5, and a status report completion interruption in step S7. When there is an interruption in any of steps S1, S3, S5, and S7, as shown in steps S2, S4, S6, and S8, each of P2, medium writing pointer P3, and status reporting pointer P4 is counted up by "1", thereby advancing the designated position for the command queue. The processes according to the flowchart of FIGS. 12A and 12B will now be described as follows with regard to the case where the two write commands CMD1 and CMD2 shown in FIGS. 10A and 10B are successively issued from the host. First, when the reception of the write commands CMD1 and CMD2 from the host is completed at time t1, the command reception completion interruption is obtained in step S1. Step S2 follows and the next command receiving pointer P1 advances by "1". Subsequently, step S9 follows and the presence or absence of the command to report the status is discriimnated. At this time, as for the pointers, since the pointers P2, P3, and P4 have been set with respect to the write command CMD1 as shown in FIG. 11A and the condition of P3 t P4 as a condition of the presence of the status report is not satisfied, the processing routine advances to step S10 and whether the data can be received or not is discriminated. It is determined in step S10 that the data can be received when there is a relation of P1 t P2 between the pointers P1 and P2. At this time, since the pointers P1 and P2 indicate the different positions as shown in FIG. 11A, P1 t P2 is satisfied and the data: can be received with respect to the write command CMD1. Subsequently, step S11 follows and whether the hard disk drive itself is at present using the host bus or not is discriminated. In this instance, since the host bus is not used, the data reception is activated in step S12. In step S13, a check is made to see if the data can be written onto the disk. The data can be written onto the disk when the relation of P2 t P3 is satisfied between the pointers P2 and P3. At this time, since the pointers P2 and P3 exist at the same position as shown in FIG. 11A, the data cannot be written. A series of processes is finished.

When the reception of the data D11 and D12 is completed at time t2 in FIGS. 10A and 10B, the host data reception completion interruption in step S3 in FIG. 12A is obtained. The data receiving pointer P2 advances by "1" in step S4. Thus, the pointer setting state for the command queue 76 in FIG. 11B is derived. Subsequently, step S9 follows and the presence or absence of the command to report the status is discriminated. In this case, since there is not the command to report the status, whether the data can be received or not is discriminated in step S10. At this time, since the pointers P1 and P2 exist at the different positions as shown in FIG. 11B, the data can be received. Since it is determined in step S11 that the hard disk drive itself is not using the host bus, the data reception of the next write command CMD2 is activated in step S12. Subsequently in step S13, whether the data can be written onto the disk or not is discriminated. In this instance, since the pointers P2 and P3 exist at the different positions as shown in FIG. 11B, the data can be written and the writing of the already received data D11 and D12 onto the disk is activated in step S14.

When the writing of the data D11 and D12 onto the disk is completed at time t3 in FIGS. 10A and 10B, the data writing completion interruption in step S5 in FIGS. 12A and 12B is obtained. The medium writing pointer P3 advances by "1" in step S6. Thus, the pointer setting state for the command queue 76 in FIG. 11C is obtained. Step S9 now follows and the presence or absence of the command to report the status is discriminated. In this case, since the status reporting pointer P4 has been set to the command CMD1 and the pointer P3 exists at the different position as shown in FIG. 11C, the presence of the status report is determined and step S15 follows. In step S15, a check is made to see if the hard disk drive itself is using the host bus. In this instance, since the host bus is receiving the data D22 of the write command CMD2 and is being used at time t3 in FIGS. 10A and 10B, the status activation in step S16 is not performed. The processing routine advances to step S13. Although whether the data can be written or not is discriminated in step S13, since the pointers P2 and P3 exist at the same position of the write command CMD2 in this case as shown in FIG. 11C, the data cannot be written. Step S14 is skipped and a series of processes is finished. Now assuming that the reception of the data D21 and D22 of the write command CMD2 is completed at time t4 in FIGS. 10A and 10B, the host data reception completion interruption is obtained in step S3 in FIGS. 12A and 12B. The data receiving pointer P2 advances by "1" in step S4. Thus, the pointer setting state for the command queue 76 in FIG. 11D is obtained. Subsequently, step S9 follows and the presence of the status report is decided. Step S15 follows. In this instance, since the data reception from the host has been completed, the host bus is not used, so that the status report is activated in step S16. Step S13 now follows and whether the data can be written or not is discriminated. At this time, since the pointers P2 and P3 exist at the different positions as shown in FIG. 11D, the data can be written with respect to the write command CMD2 in which the pointer P3 has been set. The disk writing of the data D21 and D22 is activated in step S14. When the report of the status STS1 is completed with respect to the write command CMD1 at time t5 in FIGS. 10A and 10B, the status report completion interruption in step S7 in FIGS. 12A and 12B is obtained. The status reporting pointer P4 advances by "1" in step S8, so that the pointer setting state for the command queue 76 in FIG. 11E is obtained. Subsequently, step S9 follows and the presence or absence of the status report is discriminated. Since the pointers P3 and P4 have been set to the same write command CMD2 in this case, there is no status report. Whether the data can be received at present or not is discriminated in step S10. However, since the pointers P1 and P2 have been set at the vacant positions, the activation of the data reception in step S12 is not performed. Whether the data can be written or not is discriminated in step S13. Although the pointers P2 and P3 exist at the different positions, since the disk writing has already been activated with regard to the writing command CMD2, the data writing activation in step S14 is not performed. A series of processes is finished.

Figure 13A:
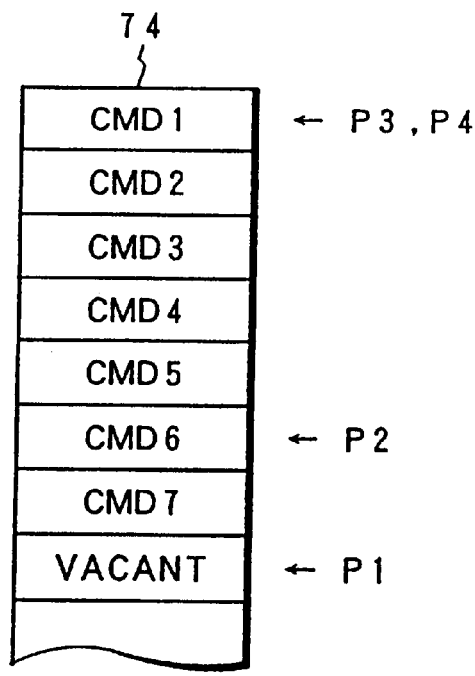
FIGS. 13A and 13B are explanatory diagrams of an optimizing process of data prewrite write commands.
Figure 13B:
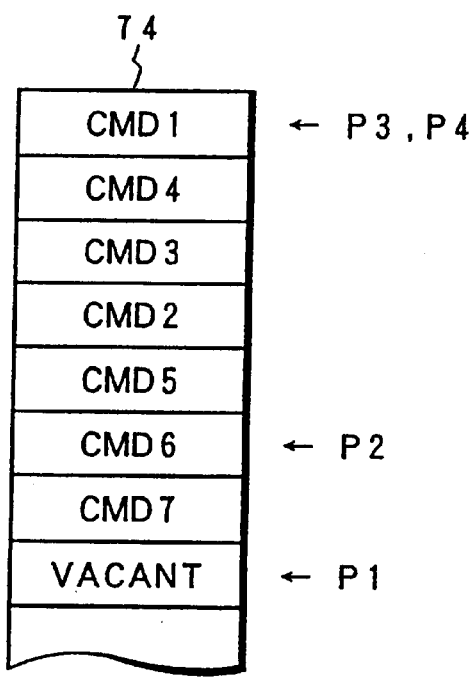

FIGS. 13A and 13B are explanatory diagrams of the optimizing process of the prewrite write commands. FIG. 13A shows a storing state of the command queue 76. In this case, a state where seven write commands CMD1 to CMD7 have successively been issued from the host is shown. The write command CMD6 shown by the data receiving pointer P2 is in a state where the data reception from the host is started or the data is being received, and the four write commands CMD2 to CMD5 before the write command CMD6 are in a state where the data has already been received from the host and the disk writing is waited. As for the head write command CMD1, the data is being written onto the disk by the pointer P3. That is, the respective write commands are in the following states. As for the write command CMD1, the data is being written onto the disk. As for the write commands CMD2 to CMD5, the data has already been prewritten. As for the write command CMD6, the data is being received from the host. As for the write command CMD7, the data reception from the host is waited. At this time, while the data is being written onto the disk by the execution of the write command CMD1, the executing order of the data prewrite write commands CMD2 to CMD5 is rearranged to the order from the write command in which the access time is the shortest from the disk writing end position of the write command CMD1 which is at present being executed. For example, assuming that the access time of the write command CMD4 is the shortest, the order of the write commands CMD2 and CMD4 is exchanged as shown in FIG. 13B. After the end of the disk writing of the write command CMD1, the disk writing of the write command CMD4 is finished.

FIG. 14 is a flowchart for a prewrite write command optimizing process in the information storing apparatus of the invention. First in step S1, an angle difference tt between the sector end position where the data is at present being written onto the disk and the sector start position to be accessed next is calculated. The angle difference tt can be calculated by converting a difference between the sector addresses into an angle. Subsequently, in step S2, a seek prediction time ts which is required from the sector end position where the data writing is at present being performed to the next start sector is calculated from the track address. In step S3, a rotational angle ts at which the next sector head position moves for the seek prediction time ts is calculated.

Now, assuming that an angular velocity of the disk medium is equal to t [rad/sec], the sector rotational angle ts is obtained by $$\theta s = w \times ts$$

Subsequently, in step S4, the angle difference $\theta t$ between the present sector end position and the next sector start position is compared with the rotational angle $\theta s$ at the next sector head position calculated from the seek prediction time ts. That is, when the rotational angle $\theta s$ at the next sector head position calculated from the seek prediction time ts is equal to or smaller than the angle difference $\theta t$ between the sector end position and the next sector start position, the seeking operation is completed until the next sector head position reaches the head, and there is no need to wait for the disk rotation. On the other hand, when the rotational angle $\theta s$ at the next sector head position obtained from the seek prediction time ts exceeds the angle difference $\theta t$ between the sector end position and the next sector start position, the disk rotation is waited. When the angle difference $\theta t$ between the sector end position and the next sector start position is equal to or larger than the rotational angle $\theta s$ at the next sector head position calculated from the seek prediction time ts in step S4, step S5 follows. An access time t is calculated as a value in which the time obtained by dividing the angle difference $(\theta t - \theta s)$ by the angular velocity w is added to the seek prediction time ts. On the contrary, when the angle difference $\theta t$ is smaller than the rotational angle $\theta s$ obtained from the seek prediction time ts, step S6 follows. An access time including the rotation waiting time in which the time obtained by dividing the angle derived by subtracting the angle difference $(\theta t - \theta s)$ from 2t indicative of one rotation by the angular velocity w is added to the seek time ts is calculated. Whether the processes have been performed with respect to all prewrite write commands or not is discriminated in step S7. The processes in steps S1 to S6 are repeated until all processes are finished. If the calculating process of the access time is finished in step S7 with regard to all prewrite write commands, the write command in which the access time is the shortest is rearranged to the position of the command to be executed next in step S8. As mentioned above, the access time is calculated during the execution of the disk writing of a certain write command with respect to the prewrite write commands in the disk writing waiting state, and the write command of the shortest access time is rearranged to the position of the write command to be executed next, so that the processing performance can be remarkably improved.

FIGS. 15A and 15B are explanatory diagrams of the segment division of the data buffer which is used in the information storing apparatus of the invention. In the data buffer 24 in FIG. 15A, the data buffer 24 is divided into, for example, eight segments 82-1 to 82-8. Each of the segments 82-1 to 82-8 is further divided into eight subsegments 84-1 to 84-8 as shown in the head segment 82-1. When a plurality of write commands are successively issued from the host, one segment is used with respect to the plurality of write commands which were successively issued, and the subsegments 84-1 to 84-8 are individually used with regard to each write command. A size of subsegment is decided by the reception in the first write command. For example, the segment is divided into subsegments each having the same size as the number of data blocks designated by the first write command. Thus, in case of FIG. 15A, in addition to the first write command, the data of the seven write commands can be subsequently prewritten with respect to the segment 82-1. Specifically speaking, the vacant subsegment is searched before the data prewrite is executed and the subsegment to be used for the command information is set. When writing, the data is written on the basis of the information of the subsegment.

FIG. 15B shows another embodiment of the division of the subsegments of the data buffer 24. In FIG. 15A, since the subsegments have been determined at regular intervals in the data reception of the first write command, if a write command of a block size larger than that of the subsegment is issued, the data cannot be stored into the buffer, so that data prewrite is finished at this time point. In FIG. 15B, therefore, if the head position and size of the subsegment can be set as segment information, even if the block size is not constant, by setting the subsegment in accordance with the designated block size, data prewrite can be performed. For example, like a segment 82-1 in FIG. 15B, as for each of the subsegments 84-1 to 84-4, by setting the head position and size of the subsegment in correspondence to the block size of each write command, the subsegments can be dynamically assured.

FIG. 16 is a functional block diagram of another embodiment of an information storing apparatus of the invention. This embodiment is characterized in that the optimization of the executing order and the data buffer division according to the invention are applied to the information storing apparatus of the data reception command completing method such that the write command issued from the host is finished by completion of the data reception from the host. The information storing apparatus is constructed by a command receiving unit 100, a data receiving unit 102, a medium writing unit 104, and a status reporting unit 106. The command queue 76 and pointer table 78 are provided for the flash memory 18 as a control storage. The command receiving unit 100 receives a plurality of write commands successively issued from the host and stores them into the command queue 76. The data receiving unit 102 receives the data by the execution of the write command from the head position in the command queue 76 and stores it into the data buffer 24. The status reporting unit 106 reports the status to the host upon completion of the data reception from the host by the data receiving unit 102, thereby finishing the write command which is being executed. The medium writing unit 104 starts the writing of the reception data onto the medium upon completion of the data reception from the host by the data receiving unit. In addition, in the embodiment of FIG. 16, an optimization processing unit 108 is provided. When a plurality of prewrite write commands in which the prewrite data has already been received exist in the command queue 76, the optimization processing unit 108 rearranges the executing order of the plurality of write commands to the order from the prewrite write command of the shortest access time, thereby optimizing it. Specifically speaking, as shown in FIG. 13A, with respect to the prewrite write commands CMD2 to CMD5, the order is rearranged in a manner such that the write command in which the access time from the write end sector position of the write command CMD1 by which the disk writing is being executed at present is the shortest becomes the write command to be executed next. For example, when the access time of the write command CMD4 is the shortest, the write command to be executed next is rearranged to the write command CMD4 as shown in FIG. 13B. The optimizing process of the prewrite write commands is performed in accordance with the flowchart of FIG. 14. Further, in the embodiment of FIG. 16, as a method of dividing the data buffer 24 into the segments, there is used either a method of fixedly dividing the segment into the subsegments on the basis of the number of blocks of the first write command as shown in FIG. 15A or a method of dynamically dividing the segment into the subsegments by allocating the head position of the subsegments and the number of blocks every write command as shown in FIG. 15B.

According to the invention as mentioned above, with respect to the apparatus such that the write command issued from the host is finished by the completion of the writing onto the disk, by performing the data prewrite in which the data is received from the host with respect to the next write command without waiting for completion of the disk writing, the delay of the writing process occurring because no data exists in the data buffer upon disk writing is prevented. The deterioration of the processing ability which is likely to occur in the case where the access time of each write command when a plurality of write commands are successively issued is short or in the case where a plurality of information storing apparatuses are connected to the host is prevented. The information storing apparatus having high processing performance for the write command can be realized.

As for a plurality of write commands in which the data prewrite from the host has been finished, by rearranging the command to be executed next so as to become the command of the shortest access time, the prewrite write commands can be optimized. The writing process of higher performance can be realized by both the improvement of the performance owing to the data prewrite and the improvement of the processing performance owing to the optimization of the command executing order.

Further, as a method of using the buffer area in case of prewriting data, the buffer area which is used by the write command during the disk writing and the buffer area which is used by the prewrite write command are made identical, so that a situation that the data of the other segments in the data buffer is destroyed due to the prewriting process of the writ e command can be prevented. By making the most of the data buffer as a reading buffer, the deterioration of the reading performance can be certainly prevented.

With respect to the method of finishing the write command by reporting the status upon completion of the disk writing in FIG. 5 and the method of finishing the write command by reporting the status upon completion of the data reception from the host in FIG. 16, means such as a switch for switching and setting the mode of either one of the command finishing methods is provided for the same hard disk, thereby enabling either the embodiment of FIG. 5 or the embodiment of FIG. 16 to be selectively used if necessary. The embodiment of FIG. 5 or the embodiment of FIG. 16 can be individually used in every hard disk drive. The present invention incorporates various proper modifications without departing from the objects and advantages of the invention and, further, is not limited by the numerical values shown in the embodiments.

What is claimed is:

1. An information storing apparatus in which a write command issued from a host is finished by completion of writing of data onto a medium, comprising:
    a command receiving unit for receiving a plurality of write commands successively issued from the host and storing said write commands into a command queue;
    a data receiving unit for receiving data corresponding to said write commands from the host and storing said corresponding data into a data buffer;
    a medium writing unit for writing said data in said data buffer corresponding to a current write command being executed onto the medium;
    a status reporting unit for reporting a status to the host upon completion of said writing of said data corresponding to said current write command by said medium writing unit, thereby finishing said current write command being executed; and
    a prewrite processing unit for storing data corresponding to a write command subsequent to said current write command into said data buffer while said data corresponding to said current write command is being written to the medium without waiting for a completion of said writing of data corresponding to said current write command onto the medium by said medium writing unit.

2. An apparatus according to claim 1, wherein a next command receiving pointer P1 showing a storing position of a next command to be received from the host, a data receiving pointer P2 showing one of said write commands at the start of reception of corresponding data from the host or during the reception of said corresponding data, a medium writing pointer P3 showing one of said write commands at the start of writing of corresponding data onto the medium from said data buffer or during the data writing of said corresponding d data, and a status reporting pointer P4 showing one of said write commands regarding which a status is reported by said status reporting unit, are further provided for said command queue,
    further wherein said next command receiving pointer P1 advances upon completion of reception of said next command by said command receiving unit, said data receiving pointer P2 advances upon completion of data reception from the host by said data receiving unit, said medium writing pointer P3 advances upon completion of writing of said corresponding data onto the medium from said data buffer by said medium writing unit, said status reporting pointer P4 advances upon completion of said status report by said status reporting unit,
    said pointers P1, P2, P3, P4 are arranged in order of said next command receiving pointer P1, data receiving pointer P2, medium writing pointer P3, and status reporting pointer P4, and whenever each of said pointers advances, one of said write commands shown by said advanced pointer is executed.

3. An apparatus according to claim 1, further comprising an optimization processing unit such that when a plurality of write commands are stored in said command queue and data corresponding to said write commands have been prewritten in said data buffer, an executing order of said plurality of write commands is rearranged to the order from a write command of a shortest access time, thereby optimizing said executing order.

4. An apparatus according to claim 3, wherein said optimization processing unit obtains an access time of said write command as a time which is required from the completion of writing of data from said data buffer to the medium of the preceding write command until a start of writing of data from said data buffer to the medium of a next write command and changes said executing order to the order from said write command of the short access time, thereby optimizing the executing order.

5. An apparatus according to claim 1, wherein when said data buffer is divided into a plurality of areas and said plurality of write commands successively issued from the host are stored into said command queue, a buffer area which is used by the write command during the medium writing and a buffer area which is used by the prewrite write command are made identical.

6. An apparatus according to claim 5, wherein said data buffer is divided into a plurality of areas each having a predetermined size and each of said areas is further finely divided into subareas by a predetermined size that is determined by data corresponding to a write command which was first stored in said command queue, data corresponding to said write commands issued after said first stored write command being stored in said subareas.

7. An apparatus according to claim 1, wherein said data buffer is divided into a plurality of areas each having a predetermined size and said areas are each divided into subareas, each of said subareas being adapted to receive data corresponding to one of said write commands, wherein a size of each said subarea is determined, in accordance with a data size of a write command to be recorded in said each subarea.

8. An information storing apparatus in which a write command issued from a host is finished by completion of data reception from the host, comprising:
    a command receiving unit for receiving a plurality of write commands successively issued from the host and storing said write commands into a command queue;
    a data receiving unit for receiving data corresponding to said write commands from the host and storing said corresponding data into a data buffer;
    a status reporting unit for reporting a status upon completion of reception of said data corresponding to said write commands by said data receiving unit to the host, thereby finishing a write command which is being executed;
    a medium writing unit for writing said data in said data buffer onto the medium upon completion of the data reception by said data receiving unit; and
    an optimization processing unit for, when a plurality of write commands are stored in said command queue and data corresponding to said write commands have been prewritten in said data buffer, rearranging an executing order of said plurality of write commands to the order from a write command of the shortest access time, thereby optimizing the executing order.

9. An apparatus according to claim 8, wherein said optimization processing unit obtains an access time of said write command as a time which is required from the completion of writing of data from said data buffer to the medium of the preceding write command until a start of writing of a next write command and changes said executing order to the order from said write command of the short access time, thereby optimizing said executing order.

10. An apparatus according to claim 8, wherein when said data buffer is divided into a plurality of areas and said plurality of write commands successively issued from the host are stored into said command queue, a buffer area which is used by the write command during the medium writing and a buffer area which is used by the prewrite write command are made identical.

11. An apparatus according to claim 10, wherein said data buffer is divided into a plurality of areas each having a predetermined size and each of said areas is further finely divided into subareas by a predetermined size that is determined by data corresponding to a write command which was first stored in said command queue data corresponding to said write commands issued after said first stored write command being stored in said subareas.

12. An apparatus according to claim 8, wherein said data buffer is divided into a plurality of areas each having a predetermined size and said areas are each divided into subareas, each of said subareas being adapted to receive data corresponding to one of said write commands, wherein a size of each said subarea is determined in accordance with a data size of a write command to be recorded in said each subarea.

* * * * *

UNITED STATES PATENT AND TRADEMARK OFFICE
CERTIFICATE OF CORRECTION

PATENT NO. : 6,389,508 B1
DATED : May 14, 2002
INVENTOR(S) : Tamura

It is certified that error appears in the above-identified patent and that said Letters Patent is hereby corrected as shown below:

Column 17,
Line 50, delete "d".

Signed and Sealed this

Eighteenth Day of March, 2003

JAMES E. ROGAN
*Director of the United States Patent and Trademark Office*